United States Patent
Vonk et al.

(10) Patent No.: US 11,104,823 B2
(45) Date of Patent: Aug. 31, 2021

(54) THIN CORROSION PROTECTIVE COATINGS INCORPORATING POLYAMIDOAMINE POLYMERS

(71) Applicant: HENKEL AG & CO. KGAA, Duesseldorf (DE)

(72) Inventors: Donald Robb Vonk, Clinton Township, MI (US); Thomas Sullivan Smith, II, Novi, MI (US); Alvaro Bobadilla, Royal Oak, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/783,038

(22) Filed: Oct. 13, 2017

(65) Prior Publication Data

US 2018/0037770 A1    Feb. 8, 2018

Related U.S. Application Data

(63) Continuation of application No. PCT/US2016/023676, filed on Mar. 23, 2016.

(60) Provisional application No. 62/148,163, filed on Apr. 15, 2015.

(51) Int. Cl.
| | | |
|---|---|---|
| C08K 3/08 | (2006.01) | |
| C09D 177/08 | (2006.01) | |
| C09D 5/08 | (2006.01) | |
| C23C 22/34 | (2006.01) | |
| C08K 3/16 | (2006.01) | |
| C08K 3/22 | (2006.01) | |
| C08K 3/28 | (2006.01) | |

(52) U.S. Cl.
CPC ........... *C09D 177/08* (2013.01); *C09D 5/084* (2013.01); *C23C 22/34* (2013.01); *C08K 3/08* (2013.01); *C08K 3/16* (2013.01); *C08K 3/22* (2013.01); *C08K 3/28* (2013.01); *C08K 2003/085* (2013.01); *C08K 2003/2244* (2013.01)

(58) Field of Classification Search
CPC ...... C08K 2003/085; C08K 2003/2244; C08K 3/08; C08K 3/16; C08K 3/22; C08K 3/28; C09D 177/08
See application file for complete search history.

(56) References Cited

U.S. PATENT DOCUMENTS

| | | |
|---|---|---|
| 3,053,691 A | 9/1962 | Hartman et al. |
| 3,717,509 A | 2/1973 | Palm et al. |
| 3,772,060 A | 11/1973 | Birchall et al. |
| 3,776,848 A | 12/1973 | Hall et al. |
| 3,869,894 A | 3/1975 | Meyer et al. |
| 3,870,737 A | 3/1975 | Birchall et al. |
| 3,912,548 A | 10/1975 | Faigen |
| 3,962,122 A * | 6/1976 | Trial ............... C23F 11/173 507/246 |
| 4,052,232 A | 10/1977 | Brock et al. |
| 4,351,883 A | 9/1982 | Marcantonio et al. |
| 4,487,812 A | 12/1984 | Kawasaki et al. |
| 4,512,818 A | 4/1985 | Valayil et al. |
| 4,586,977 A | 5/1986 | Adams et al. |
| 4,617,056 A | 10/1986 | Mosser et al. |
| 4,637,839 A | 1/1987 | Hall |
| 4,659,394 A | 4/1987 | Hara et al. |
| 4,659,395 A | 4/1987 | Sugama et al. |
| 4,695,516 A | 9/1987 | Masuhara et al. |
| 4,702,968 A | 10/1987 | Masuhara et al. |
| 4,828,616 A | 5/1989 | Yamasoe |
| 4,830,101 A | 5/1989 | Ohara et al. |
| 5,283,276 A | 2/1994 | Best et al. |
| 5,292,378 A | 3/1994 | Ouyang et al. |
| 5,389,405 A | 2/1995 | Purnell et al. |
| 5,401,333 A | 3/1995 | Ouyang et al. |
| 5,409,970 A | 4/1995 | Mosser et al. |
| 5,518,555 A | 5/1996 | Ouyang et al. |
| 5,527,854 A | 6/1996 | Matsukawa et al. |
| 5,538,078 A | 7/1996 | Mizuno et al. |
| 5,604,040 A | 2/1997 | Sugama |
| 5,746,973 A | 5/1998 | Naraghi |
| 5,904,784 A * | 5/1999 | Lino ............... C23C 22/361 148/247 |
| 5,945,212 A | 8/1999 | Tanaka et al. |
| 6,013,377 A | 1/2000 | Kanda et al. |
| 6,072,055 A | 6/2000 | Crook et al. |
| 6,159,534 A | 12/2000 | Takeda |
| 6,217,935 B1 | 4/2001 | Hubbell |
| 6,248,181 B1 | 6/2001 | Tomohiro et al. |
| 6,291,020 B1 | 9/2001 | Melzer et al. |
| 6,300,395 B1 | 10/2001 | Sako et al. |
| 6,383,307 B1 | 5/2002 | Kucera et al. |
| 6,423,425 B1 | 7/2002 | Faucher et al. |

(Continued)

FOREIGN PATENT DOCUMENTS

| | | |
|---|---|---|
| CA | 2394766 A1 | 6/2001 |
| CN | 1363724 A | 8/2002 |

(Continued)

OTHER PUBLICATIONS

Huey et al (Corrosion 2000, "High Temperature Corrosion Inhibition Performance of Imidazoline and Amide") (Year: 2000).*

(Continued)

*Primary Examiner* — Karuna P Reddy
(74) *Attorney, Agent, or Firm* — Mary K. Cameron

(57) ABSTRACT

Anti-corrosion metal pretreatment compositions comprising a Group IVB metal, a Group IB metal and polyamidoamine polymers; replenisher compositions for the metal pretreatment compositions; methods of making the metal pretreatment compositions; methods of forming an anti-corrosion Group IVB oxide coating on at least one metal substrate surface by contacting the surface with the metal pretreatment composition; and coated metal substrates having anti-corrosion coatings deposited on the metal substrates from chrome VI free, anti-corrosion metal pretreatment compositions having enhanced corrosion resistance of the Group IVB metal oxide coatings and adhesion of the anti-corrosion and primer coating layers to metal substrates.

19 Claims, No Drawings

(56) References Cited

U.S. PATENT DOCUMENTS

| | | |
|---|---|---|
| 6,432,220 B1 | 8/2002 | Lindemann et al. |
| 6,436,201 B1 | 8/2002 | Sugita et al. |
| 6,476,119 B1 | 11/2002 | Kucera et al. |
| 6,541,600 B1 | 4/2003 | Wang et al. |
| 6,610,422 B1 | 8/2003 | Ooi et al. |
| 6,719,852 B2 | 4/2004 | Oshima et al. |
| 6,740,361 B1 | 5/2004 | Bibber |
| 6,755,917 B2 | 6/2004 | Hardin et al. |
| 6,773,516 B2 | 8/2004 | Hardin et al. |
| 6,777,034 B2 | 8/2004 | Berger et al. |
| 6,828,033 B1 | 12/2004 | Bancroft et al. |
| 7,029,522 B2 | 4/2006 | Matsui et al. |
| 7,291,401 B2 | 11/2007 | Suzuki et al. |
| 7,344,607 B2 | 3/2008 | Melzer et al. |
| 7,442,676 B2 | 10/2008 | Yang et al. |
| 7,503,381 B2 | 3/2009 | Inbe et al. |
| 7,658,791 B2 | 2/2010 | Nagai et al. |
| 7,736,730 B2 | 6/2010 | Jung et al. |
| 7,767,111 B2 | 8/2010 | Nakazawa |
| 7,842,403 B2 | 11/2010 | Meyer, Jr. et al. |
| 7,879,158 B2 | 2/2011 | Dietsche et al. |
| 8,066,824 B2 | 11/2011 | Breitenkamp et al. |
| 8,273,189 B2 | 9/2012 | Derule et al. |
| 8,293,029 B2 | 10/2012 | Jueptner et al. |
| 8,491,729 B2 | 7/2013 | Bammel et al. |
| 8,609,195 B2 | 12/2013 | Bauerochse et al. |
| 8,628,689 B2 | 1/2014 | Visser et al. |
| 8,679,593 B2 | 3/2014 | Le Craz |
| 8,722,147 B2 | 5/2014 | Monzyk et al. |
| 8,932,679 B2 | 1/2015 | Walter et al. |
| 9,297,079 B2 | 3/2016 | Hirai et al. |
| 9,739,544 B2 | 8/2017 | Matsui et al. |
| 2002/0192511 A1 | 12/2002 | Hruschka et al. |
| 2003/0104227 A1 | 6/2003 | McCarthy et al. |
| 2003/0138567 A1 | 7/2003 | Schenzle et al. |
| 2003/0168127 A1 | 9/2003 | Hamamura et al. |
| 2003/0199629 A1 | 10/2003 | Gelman et al. |
| 2004/0009300 A1 | 1/2004 | Shimakura et al. |
| 2004/0054044 A1 | 3/2004 | Bittner et al. |
| 2004/0115448 A1 | 6/2004 | Bibber |
| 2004/0167266 A1 | 8/2004 | Hasegawa et al. |
| 2005/0126427 A1 | 6/2005 | Gonzalez et al. |
| 2005/0252578 A1 | 11/2005 | Tarlowski et al. |
| 2005/0276983 A1 | 12/2005 | Kashiwada et al. |
| 2006/0003904 A1 | 1/2006 | Maeda et al. |
| 2006/0264676 A1 | 11/2006 | Mertens et al. |
| 2007/0190259 A1 | 8/2007 | Bittner et al. |
| 2008/0063804 A1 | 3/2008 | Stoffer et al. |
| 2008/0119628 A1 | 5/2008 | Wada et al. |
| 2008/0145678 A1* | 6/2008 | McMurdie ............... B05D 7/16 428/457 |
| 2008/0187672 A1 | 8/2008 | Yu |
| 2008/0193652 A1 | 8/2008 | De Figueiredo Gomes et al. |
| 2008/0199723 A1 | 8/2008 | Cho et al. |
| 2008/0274363 A1 | 11/2008 | Bibber |
| 2008/0292894 A1 | 11/2008 | Park et al. |
| 2008/0302448 A1* | 12/2008 | Frey .................. B05D 7/14 148/274 |
| 2008/0305431 A1 | 12/2008 | Powell et al. |
| 2010/0163423 A1 | 7/2010 | December et al. |
| 2010/0215965 A1 | 8/2010 | Tadaki et al. |
| 2010/0221549 A1 | 9/2010 | Shigekuni et al. |
| 2011/0008644 A1 | 1/2011 | Naritomi et al. |
| 2011/0052112 A1 | 3/2011 | Yamane et al. |
| 2011/0100830 A1 | 5/2011 | Ishii et al. |
| 2011/0212332 A1 | 9/2011 | Matsuzawa et al. |
| 2013/0037175 A1 | 2/2013 | Fleischhaker et al. |
| 2013/0040164 A1 | 2/2013 | Bhaatia et al. |
| 2013/0098679 A1* | 4/2013 | Takata .................. C08L 23/26 174/74 R |
| 2013/0177768 A1 | 7/2013 | Krueger et al. |
| 2013/0244024 A1 | 9/2013 | Huffer et al. |

FOREIGN PATENT DOCUMENTS

| | | | |
|---|---|---|---|
| CN | 100510177 C | 7/2009 | |
| CN | 100577870 C | 1/2010 | |
| CN | 102409332 A | 4/2012 | |
| DE | 69715734 T2 | 5/2003 | |
| EP | 0016296 A1 | 10/1980 | |
| EP | 0025236 A1 | 3/1981 | |
| EP | 0024062 B1 | 11/1983 | |
| EP | 0240940 A2 | 10/1987 | |
| EP | 0276476 A1 | 8/1988 | |
| EP | 0838537 A1 | 4/1998 | |
| EP | 0623653 B1 | 12/2000 | |
| EP | 1852523 A1 | 11/2007 | |
| EP | 1622987 B1 | 1/2008 | |
| EP | 2302097 B1 | 11/2014 | |
| JP | 57079180 A | * 5/1982 | ............ C23F 11/10 |
| JP | 10072680 A | 3/1998 | |
| JP | 10509766 A | 9/1998 | |
| JP | 2002035687 A | 2/2002 | |
| JP | 2003138382 A | 5/2003 | |
| JP | 2004528432 A | 9/2004 | |
| JP | 3871361 B2 | 1/2007 | |
| JP | 2007026924 A | 2/2007 | |
| JP | 2009280889 A | 12/2009 | |
| JP | 2010163640 A | 7/2010 | |
| JP | 4646966 B2 | 12/2010 | |
| JP | 4683582 B2 | 5/2011 | |
| JP | 5123051 B2 | 1/2013 | |
| JP | 2013023701 A | 2/2013 | |
| JP | 2015052168 A | 3/2015 | |
| WO | 9316140 A1 | 9/1993 | |
| WO | 0068325 A2 | 11/2000 | |
| WO | 200158909 A1 | 8/2001 | |
| WO | 0220652 A1 | 3/2002 | |
| WO | 0231065 A2 | 4/2002 | |
| WO | 03052005 A1 | 6/2003 | |
| WO | 2004101693 A1 | 11/2004 | |
| WO | 2007061011 A1 | 5/2007 | |
| WO | 2009073112 A1 | 6/2009 | |
| WO | 2007105800 A1 | 7/2009 | |
| WO | 2010049198 A1 | 5/2010 | |
| WO | 2010112605 A1 | 10/2010 | |
| WO | 2012001981 A1 | 1/2012 | |
| WO | 2012078788 A2 | 6/2012 | |
| WO | 2013133434 A1 | 9/2013 | |
| WO | 2015171413 A1 | 11/2015 | |

OTHER PUBLICATIONS

A partial human translation and full machine translation into English of JP 57-079180 A; Akashi et al; (Year: 1982).*

International Search Report, PCT/US2016/023676, dated Sep. 8, 2016. All references cited in the International Search Report are listed herein.

* cited by examiner

THIN CORROSION PROTECTIVE COATINGS INCORPORATING POLYAMIDOAMINE POLYMERS

TECHNICAL FIELD

This invention relates generally to very thin protective conversion coatings containing Group IVB metal oxide, copper and particular nitrogen containing organic polymers comprising amide functional groups and optionally amine and/or imidazoline functional groups, deposited on metal surfaces thereby providing the metal surfaces with improved corrosion protection as compared to metal surfaces having similar protective coatings in the absence of the polymers. The invention is also directed to aqueous pretreatment compositions for depositing said coatings, and methods of making and using the compositions.

BACKGROUND OF THE INVENTION

Coatings to protect against corrosion, particularly anti-corrosion conversion coatings that are applied as pretreatments, prior to primer and paint coatings on metal substrates, are constantly being developed to take advantage of new techniques and coating materials to reduce the effects on the environment. These coatings are also called surface treatments and often are called conversion coatings. In general, the pretreatment compositions are used in "wet on wet" processes wherein a substrate has the pretreatment coating applied to it and then without further drying another coating is applied to the pretreated substrate such as a paint or primer coating. In the past, a standard pretreatment coating included zinc phosphate as a component to provide the corrosion protection. Due to environmental concerns with the use of phosphate solutions, attempts have been made to develop alternative compositions that do not include zinc phosphate, for example Group IVB metal oxide based anti-corrosion coatings. One drawback of known zirconium oxide coatings is that they are not always as effective in preventing corrosion as are the zinc phosphate coatings being replaced.

It is desirable to improve the corrosion protection provided by Group IVB metal oxide containing coatings with as little disruption to the coating process as possible, e.g. avoiding additional steps in the process. In addition, it is desirable to improve the adhesion of primer and paint layers to metal substrates when using Group IVB metal oxide containing coatings.

SUMMARY OF THE INVENTION

It has been surprisingly found that Group IVB metal ion pretreatment compositions incorporating a combination of copper ion and at least one organic polymer comprising amide functional groups and optionally amine and/or imidazoline functional groups provides significant improvements in corrosion resistance to a variety of metal substrates. Coatings deposited by contact with the pretreatment contain a combination of the polymer, copper and Group IVB oxide, e.g. zirconium oxide.

In general terms, the present invention provides Group IVB metal, e.g. Zr, Ti and/or Hf, containing pretreatment compositions, also referred to herein as surface treatment compositions, which incorporate at least one organic polymer comprising amide functional groups and optionally amine and/or imidazoline functional groups. Desirably, the organic polymers are selected from polyamidoamines, as described herein; and may include imidazoline functional groups. Preferably, at least some imidazoline functional groups comprise amide linkages on their substituents, as described below.

The present invention also provides methods of making and using the above-described compositions as well as metal substrates having deposited thereon Group IVB metal oxide containing coatings comprising said organic polymers and/or reaction products of the above-described polymers with one or more of the metal substrate and other components in the coating bath.

The Group IVB metal containing pretreatment composition containing at least one organic polymer comprising amide functional groups and optionally amine and/or imidazoline functional groups, most preferably a polyamidoamine polymer can improve adhesion & corrosion resistance through forming a barrier layer, bind to metal substrates, bind Zr & Cu in the coating layer, and react with E-coat (e.g. increase crosslinking).

In one embodiment, Group IVB metal oxide containing coatings comprising polyamidoamine and/or amidoalkyl imidazoline polymers, preferably comprising amine functionality, have highly improved corrosion protection. In addition, the polymers improved the adhesion of the Group IVB metal oxide containing coatings and subsequently applied layers of primer and paints to the metal substrates.

An object of the invention is to provide an anti-corrosion metal pretreatment composition comprising:
  a) from 10 to 2000 ppm of Group IVB metal; preferably Ti, Zr, most preferably Zr;
  b) from 1 to 50 ppm of copper;
  c) from 1 to 5000 ppm of at least one nitrogen containing organic polymer, dissolved and/or dispersed in the composition and comprising a plurality of organic amide functional groups and optionally amine and/or imidazoline functional groups; and
  d) water;
  said coating composition having a pH of from 2 to 6.

Another object of the invention is to provide an anti-corrosion metal pretreatment composition, wherein the polymer c) has a viscosity at 25° C. of 1 to 400 poise and/or wherein the polymer c) has an amine value in a range of 100 to 1000 mg KOH/gram of polymer, and/or wherein c) remains stably dissolved and/or dispersed in the composition against spontaneous separation or segregation of bulk phases that is perceptible with normal unaided human vision during storage at 25° C. for at least 10 days after preparation of the pretreatment composition.

Another object of the invention is to provide an anti-corrosion metal pretreatment composition wherein the polymer c) comprises a plurality of amine functional groups in addition to the amide functional groups.

An object of the invention is to provide an anti-corrosion metal pretreatment composition wherein the Group IVB metal is zirconium and the polymer c) comprises at least one polyamidopolyamine polymer. Another object of the invention is to provide an anti-corrosion metal pretreatment composition wherein the at least one polyamidopolyamine polymer has a weight average molecular weight ranging from 200 to 10,000 Daltons.

Another object of the invention is to provide an anti-corrosion metal pretreatment composition wherein less than 25 molar percent, preferably less than 5 molar percent, most preferably zero molar percent of nitrogen atoms contained in the polymer are part of a lactam ring. Another object of the invention is to provide an anti-corrosion metal pretreatment composition, wherein at least some of the organic amide functional groups have dehydrated to imidazoline functional groups, preferably said imidazoline functional groups retain at least one amide linkage in the polymer.

Another object of the invention is to provide an anti-corrosion metal pretreatment composition wherein the polymer comprises tertiary nitrogen atoms. Another object of the invention is to provide an anti-corrosion metal pretreatment composition, wherein the polymer has multiple branches.

Another object of the invention is to provide an anti-corrosion metal pretreatment composition wherein one or more polyamidoamine polymers according to the general formula (I) are present as the nitrogen containing polymer:

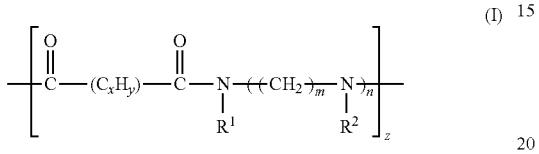

where, independently for each of said one or more polyamidoamine polymers:
$R^1$ represents a hydrogen or an organic moiety, preferably a saturated or unsaturated alkyl group; $R^2$ represents a hydrogen or an organic moiety, preferably a saturated or unsaturated alkyl group; m represents a number ranging from 1 to 8, preferably 2 to 6; n represents a number ranging from 1 to 8; x represents a number ranging from 1 to 40; y represents a number ranging from 2 to 80; z represents a number ranging from 2 to 500.

An object of the invention is to provide an anti-corrosion metal pretreatment composition, wherein said coating composition further comprises from 5 to 200 ppm of free fluoride and has a pH of 3.6 to 5.5. Another object of the invention is to provide an anti-corrosion metal pretreatment composition, wherein said coating composition further comprises at least 3000 ppm of nitrate. Another object of the invention is to provide an anti-corrosion metal pretreatment composition, wherein said at least one nitrogen containing organic polymer comprises at least one polyamidoamine polymer which is a reaction product resulting from a polymerization reaction of alkyldiamines, polyamines and/or polyalkylpolyamines with a carboxylic acid or carboxylic acid derivative having a reactive carboxylate group and at least one additional amine reactive functional group, preferably at least two additional amine reactive functional groups. Another object of the invention is to provide an anti-corrosion metal pretreatment composition, wherein said polyamine is selected from the group consisting of polyethylene polyamines, polypropylene polyamines, polybutylene polyamines, polypentylene polyamines, polyhexylene polyamines, and mixtures thereof. A further object of the invention is to provide an anti-corrosion metal pretreatment composition, wherein said polymer comprises at least one polyamidoamine polymer which is a reaction product resulting from a polymerization reaction of:
1) at least one carboxylic acid selected from the group consisting of a $C_6$ to $C_{24}$ monocarboxylic fatty acid, a $C_6$ to $C_{20}$ dicarboxylic acid, a $C_{12}$ to $C_{40}$ fatty acid dimer, and mixtures thereof; and
2) at least one polyamine having at least two amine groups.

Another object of the invention is to provide an anti-corrosion metal pretreatment composition wherein said at least one carboxylic acid is selected from the group consisting of fatty acid dimers, tall oil fatty acids, and mixtures thereof. Another object of the invention is to provide an anti-corrosion metal pretreatment composition wherein said at least one polyamine is selected from the group consisting of diamines, tris(2-aminoethyl) amine, polyethylene polyamines, and mixtures thereof.

An object of the invention is to provide a metal substrate coated with a solid anti-corrosion Group IVB oxide coating comprising:
I) a Group IVB metal oxide,
II) copper,
III) metal ions, different from I and II, dissolved from the metal substrate; and
IV) at least one organic polymer comprising amide functional groups and optionally amine and/or imidazoline functional groups and/or reaction products of said polymer with one or more of copper, the metal substrate and other components in the coating bath; wherein the anti-corrosion coating comprises from 1 to 30%, preferably 2 to 15%, most preferably 3-10% by weight nitrogen, from d., based on total coating weight.

Another object of the invention is to provide a coated metal substrate wherein said composition forms a coating having a thickness of from 10 to 200 nanometers on said metal substrate.

An object of the invention is to provide a method of making an anti-corrosion metal pretreatment composition comprising steps of:
a) providing deionized water at a predetermined level in a bath container;
b) adding to the deionized water of step a) a sufficient amount of a source of Group IVB metal and a sufficient amount of a source of copper to result in amounts in a ready-to-use bath composition of from 10 to 2000 ppm of dissolved Group IVB metal and from 1 to 50 ppm of dissolved copper;
c) dissolving and/or dispersing in the bath container after step b), a sufficient amount of at least one organic polymer comprising amide functional groups and optionally amine and/or imidazoline functional groups, to result in an amount of from 1 to 5000 ppm of said polymer present in the ready-to-use bath composition; and
d) adjusting pH of the bath composition as needed to achieve a ready-to-use bath composition having a pH of from 2-6.

An object of the invention is to provide a method further comprising in step b) adding to the deionized water of step a) a sufficient amount of a source of fluoride ions and a source of nitrate ions to result in amounts in the ready-to-use bath composition of from 5 to 200 ppm of free fluoride and 500 ppm or greater of nitrate ions.

An object of the invention is to provide a method of forming an anti-corrosion Group IVB oxide coating on at least one metal substrate surface by contacting the surface with at least a portion of a specified total volume of an anti-corrosion metal pretreatment composition according to the invention, for a selected period of time, said process including steps of:
(A) measuring a pH value of, dissolved Group IVB metal concentrations in, dissolved copper concentrations in, and dissolved and/or dispersed polymer c) concentrations in the specified total volume of pretreatment composition as it is used;
(B) at at least one specified time after beginning use of the specified total volume of the pretreatment composition, said specified time being within a period of time over which the process is operated and being not more than 480 minutes, preferably not more than 200 minutes, and, if the specified period of time is at least 400 minutes, also at one or more successive times thereafter, removing a specified fraction of the total volume of the treatment composition from contact with the remainder of the total volume of the treatment composition, said one or more successive times thereafter being selected such that not more than 200 minutes elapses between any such successive time and a most nearly preceding time at which a specified total fraction of the specified total volume of the treatment composition has been removed from contact with the remainder of the specified total volume of the treatment composition, said specified fraction or fractions of the specified total volume of the treatment being selected so that a ratio of said specified period of time, measured in hours, to a sum of all said specified fraction or fractions of the specified total volume that are removed from contact with the remainder of the specified total volume during said period of time has a numerical value not greater than 100; and (C) adding one or more suitable replenisher compositions to the treatment composition, in order to maintain the pH value of the composition, the dissolved Group IVB metal concentrations of the composition, dissolved copper concentrations of the composition, and the dissolved and/or dispersed polymer c) concentrations of the composition within respectively specified ranges for each of the pH value, the dissolved Group IVB metal concentration, dissolved copper concentration, and dissolved and/or dispersed polymer c) concentration.

An object of the invention is to provide a replenisher composition for an anti-corrosion pretreatment composition bath comprising:

a sufficient amount of dissolved Group IVB metal and dissolved copper such that when said replenisher composition is added to a working bath of the anti-corrosion metal pretreatment composition levels of Group IVB metal and copper in the working bath are replenished to a Group IVB metal concentration of from 10 to 2000 ppm and a copper concentration of 1 to 50 ppm in said bath; and a sufficient amount of polymer c), such that when said replenisher composition is added to the working bath, a level of said at least one polyamidoamine polymer in the working bath is replenished to a concentration of from 1 to 5000 ppm in said bath.

An object of the invention is to provide replenisher compositions wherein said replenisher composition further comprises a sufficient amount of fluorine such that when said replenisher composition is added to a bath a level of free fluoride is replenished to a level of from 5 to 200 ppm of free fluoride in said bath. Another object of the invention is to provide replenisher compositions wherein said replenisher composition further comprises a sufficient amount of nitrate such that when said replenisher composition is added to a bath a level of nitrate is replenished to a level of at least 500 ppm of nitrate in said bath. Yet another object of the invention is to provide a replenisher composition wherein said at least one polyamidoamine polymer is a reaction product resulting from a condensation polymerization reaction of:

a) at least one carboxylic acid selected from the group consisting of a $C_6$ to $C_{24}$ monocarboxylic fatty acid, a $C_6$ to $C_{20}$ dicarboxylic acid, a $C_{12}$ to $C_{40}$ fatty acid dimer, and mixtures thereof; and b) at least one polyamine having at least two primary amine groups.

The present invention is further directed to creating a replenisher composition that can be used to replenish a working bath containing the above-described anti-corrosion Group IVB metal containing pretreatment composition.

In one embodiment, Group IVB metal containing pretreatment composition containing at least one organic polymer comprising amide functional groups and optionally amine and/or imidazoline functional groups, has amide linkages limited to organic non-cyclic amide linkages. The amide linkages of the present invention are what are known as organic amides meaning they are oxygen-carbon-nitrogen based linkages and preferably do not include sulfonamides or phosphoramides, preferably containing less than 25, 20, 15, 10, 5, 1, 0.5, 0.005, 0.005 molar percent, most preferably zero molar percent of sulfonamides or phosphoramides. Generally, the amide linkages present in polymers suitable for use in the Group IVB metal containing pretreatment composition do not include cyclic amides, also known as lactam, e.g.; vinylpyrrolidones and piperidinones. Preferably, less than 25, 20, 15, 10, 5, 1, 0.5, 0.005, 0.005 molar percent, most preferably zero molar percent of the nitrogen atoms contained in the polymer are part of a lactam ring. Also, the organic polymers comprising amide functional groups and optionally amine and/or imidazoline functional groups, and preferably the polyamidoamine polymers that find use in the present invention desirably do not include epihalohydrin functions nor are they derived from epihalohydrins. Polyamidoamine-epichlorohydrin (PAAE) has decreased storage stability as compared to polyamidoamine and/or amidoalkyl imidazoline polymers used in the invention. Storage for too long or at too high a temperature causes PAAE to react with itself such that it loses its activity. Long exposure to high heat, such as in an automotive paint oven can reduce the performance of PAAE resins. Further, PAAE synthesis tends to generate organic halogenated byproducts, which are environmentally undesirable. Accordingly, polymers used in the invention preferably contain less than 25, 20, 15, 10, 5, 1, 0.5, 0.005, 0.005 molar percent, most preferably zero molar percent of epihalohydrin functional groups or derivatives thereof.

Except in the claims and the specific examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. In the present specification and claims, the values of components are understood to be parts by weight based on the total weight of the composition unless otherwise designated. Also, throughout unless expressly stated to the contrary: percent, amount, "parts of", and ratio values are by weight; molecular weight (MW) means weight average molecular weight; the term "polymer" includes "oligomer", "copolymer", "terpolymer", and the like; the first definition or description of the meaning of a word, phrase, acronym, abbreviation or the like applies to all subsequent uses of the same word, phrase, acronym, abbreviation or the like and applies, mutatis mutandis, to normal grammatical variations thereof; the term "mole" and its variations may be applied to ions, moieties, elements, and any other actual or hypothetical entity defined by the number and type of atoms present in it, as well as to materials with well-defined neutral molecules; the description of a group or class of materials as suitable or preferred for a given purpose in connection with the invention implies that mixtures of any two or more of the members of the group or class are equally suitable or preferred; description of preparation of liquid compositions or components thereof by utilizing electrically neutral chemical constituents refers to the constituents at the time of first addition to any combination specified in the description, and does not necessarily preclude chemical interactions among the constituents of a mixture, or physical changes in such properties as distribution of materials between dispersed and continuous phases in a dispersion, after mixing has occurred; specification of materials in ionic form implies the presence of sufficient counterions to produce electrical neutrality for the composition as a whole; and any counterions thus implicitly specified preferably are selected from among other constituents explicitly specified in ionic form, to the extent possible; otherwise such counterions may be freely selected, except for avoiding counterions that act adversely to the objects of the invention. In addition, all designated ranges include all values between the two endpoints of the range. All Group IVB metal oxide containing coatings described in the present specification, unless specifically stated otherwise, are to be understood to be anti-corrosion coatings for the substrates. Because the Group IVB metal oxide coatings of the present invention are used as very thin layers, they are often designated in the industry as pretreatments or coatings interchangeably.

These and other features and advantages of this invention will become more apparent to those skilled in the art from the detailed description of a preferred embodiment. The drawings that accompany the detailed description are described below.

BRIEF DESCRIPTION OF THE DRAWINGS

None.

DETAILED DESCRIPTION OF A PREFERRED EMBODIMENT

In general terms, the present invention provides pretreatment compositions comprising Group IVB metal, e.g. Zr, Ti and/or Hf; copper and at least one dissolved and/or stably dispersed organic polymer comprising amide functional groups and optionally amine and/or imidazoline functional groups, preferably comprising amide and amine functional groups, most preferably polyamidoamines.

The present invention also provides methods of making and using the above-described compositions as well as metal substrates having deposited thereon Group IVB metal oxide containing coatings comprising the above-described organic polymers and/or reaction products of said polymers with one or more of the metal substrate and other components in the coating bath and copper.

The anti-corrosion conversion coatings according to the present invention are very thin, on the order of 20 to 200 nanometers in thickness, thus they are more in the nature of a pretreatment as opposed to a coating. Conversion coatings according to the invention deposited on metal substrates, comprise Group IVB metal oxide, copper, metal ions dissolved from the metal substrate and organic polymers comprising amide functional as described herein and/or reaction products of said polymers with one or more of copper, the metal substrate and other components in the coating bath. Preferably, the anti-corrosion coatings incorporating the polyamidoamine polymers according to the present invention provide a coating on a substrate wherein the coating has from 1 to 30%, preferably 2 to 15%, most preferably 3-10% by weight nitrogen based on the total coating weight. As discussed herein, nitrogen measured in coatings according to the present invention is shown to have been derived from nitrogen in the organic polymers comprising amide functional groups, where no nitrogen is detectable in anti-corrosion coatings deposited from similar pretreatment compositions that do not include polymers according to the invention. In one embodiment, amide-containing polymers used in the invention may be evenly distributed throughout the coating. In another embodiment, amide-containing polymers used in the invention may be distributed in the coating such that a concentration gradient of the polymer is observed.

The combination of the at least one organic polymer comprising amide functional groups and optionally amine and/or imidazoline functional groups with a Group IVB metal containing pretreatment bath containing copper, as described herein provides a synergy that results in deposition of a thinner zirconium oxide containing coating with improved corrosion resistance as compared to identical pretreatment compositions in the absence of the polymers. This synergy is surprising in that where a pretreatment has a selected coating thickness providing good corrosion resistance, reducing the coating thickness would be expected to negatively affect corrosion resistance. Instead, in embodiments of the instant invention, despite thinner pretreatment coatings, the corrosion resistance is improved. Likewise, despite lower Group IVB metal amounts in the coating, improved corrosion resistance was observed.

In the present invention, suitable organic polymer comprising amide functional groups and optionally amine and/or imidazoline functional groups, preferably polyamidoamine polymers, are added to the Group IVB metal containing pretreatment at a level of from 1 part per million (ppm) up to 5000 ppm or higher, provided it does not destabilize the bath or negatively affect deposition or performance of the resulting coating. The Group IVB metal containing pretreatment preferably contains, in ppm 1, 2, 3, 4, 5, 6, 7, 8, 9, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 400, 500, 600, 700, 800, 900, 1000, 1500, 2000, 2500, 3000, 3500, 4000, 4500, or 5000 ppm of a suitable polymer useful in the invention. The Group IVB metal containing metal pretreatment includes from 10 to 2000 ppm of Group IVB metal, preferably from 20 to 1000 ppm, most preferably 100 to 700. The Group IVB metal containing metal pretreatment contains from 1 to 50 ppm of copper or more provided the level of copper does not destabilize the bath, more preferably from 2, 3, 4, or 5 and less than 50, 40 or 30 ppm. The Group IVB metal containing metal pretreatment contains from 5 to 200 ppm of free fluoride, more preferably 15, 16, 17, 18, 19, 20, 21, 22, 23, 24, 25, 26, 27, 28, 29, 30, 31, 32, 33, 34, 35, 36, 37, 38, 39, or 40 ppm. The Group IVB metal containing metal pretreatment optionally may contain nitrate at a level of 500 ppm to about 6000 or greater, provided the level is not so high as to destabilize the bath, preferably the amount ranges from 1000 to 4000. The pH of the bath is kept in the range of from 2 to 6, preferably 3.6 to 5.5, more preferably from 3.6 to 4.6.

As discussed above, use of at least one organic polymer comprising amide functional groups and optionally amine and/or imidazoline functional groups, preferably polyamidoamine polymers, in pretreatment compositions according to the invention provide unexpected improvements in corrosion performance and paint adhesion, particularly for cold rolled steel. Applicants through testing of a variety of polymers, as shown in the examples, discovered a set of polymers having particular functional groups that could be stably dissolved and/or dispersed in the acidic conversion coating bath, deposit on metal substrates contacted therewith and provide improved corrosion and paint adhesion performance. All polymers tested did not provide corrosion performance improvements, only the unique combination of organic polymer comprising amide functional groups and optionally amine and/or imidazoline functional groups provided the sought after result.

Suitable organic polymer comprising amide functional groups desirably have a viscosity enabling easy incorporation of the polymer into the pretreatment bath, at temperatures ranging from room temperature to about 35° C. In one embodiment, useful polymers have a viscosity of 1 to 400 poise at 25° C. Once dissolved or dispersed in the pretreatment composition or bath, suitable polymers should remain stably dissolved and/or dispersed in the composition against spontaneous separation or segregation of bulk phases that is perceptible with normal unaided human vision during storage at 25.degree. C. for at least 10 days after preparation of the pretreatment composition or bath. Preferably, the polymers resist hydrolysis and in particular resist gelling in the acidic pretreatment composition.

Desirably, polymers useful in the invention comprise both amide and amine functional groups and have an amine value in a range of 100 to 1000 mg KOH/gram of polymer.

In one embodiment, the pretreatment composition comprises at least one organic polymer comprising amide functional groups and optionally amine and/or imidazoline functional groups useful in the invention having a number average molecular weight ranging from about 200 to 10,000 Daltons. In one embodiment, the pretreatment composition according to the invention comprises one or more polyamides having a number average molecular weight ranging from about 200, 500, 700, 1000, 2000 Daltons. In another embodiment, the pretreatment composition comprises a mixture of two polyamides, wherein a first polyamide has a number average molecular weight of from about 200 to 400 Daltons and a second polyamide, different from the first, has a number average molecular weight of about 700 to about 2000 Daltons.

In another embodiment, the pretreatment composition according to the invention comprises one or more polyamidoamine linear and/or branched polymers. In this embodiment, the polyamidoamine is a highly branched structure. Desirably, the polyamidoamine polymer may comprise tertiary amine centers having three alkylene substituents each terminated with a nitrogen atom, said nitrogen atom being further polymerized with other monomers, such as carboxylic acids and the like, as is known in the art.

In one embodiment, polymers according to the general formula (I) are present as the at least one nitrogen containing organic polymer:

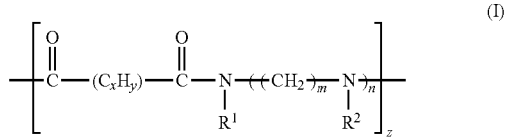

(I)

where, independently for each of said one or more polyamidoamine polymers:

R1 represents a hydrogen or an organic moiety, preferably a saturated or unsaturated alkyl group;

R2 represents a hydrogen or an organic moiety, preferably a saturated or unsaturated alkyl group;

m represents a number ranging from 1 to 8, preferably 2 to 6;

n represents a number ranging from 1 to 8;

x represents a number ranging from 1 to 40;

y represents a number ranging from 2 to 80;

z represents a number ranging from 2 to 500.

In one embodiment, the polyamidoamine polymer comprises a mass ratio of carboxylic acid residues to alkyleneamine residues of from about 99:1 to about 50:50, preferably about 97:3 to about 70:30. For example, one polyamidoamine useful in the invention that is a reaction product of tall oil fatty acids and polyethyleneamine is about 80-95 wt. % tall oil fatty acid residues and 5-20 wt. % polyethylenepolyamine residues.

Polyamidoamine polymers suitable for use in compositions and coatings according to the present invention can be formed by polymerization reactions as known to those of skill in the art using known monomers or oligomers to produce nitrogen containing organic polymers comprising amide and amine functional groups, optionally with imidazoline functional groups. There is extensive literature available detailing processes and raw materials for obtaining the desired functional groups either by polymerization of monomers or by polymerization followed by modification of polymeric functional groups to achieve the desired amide and amine functionality. Solely by way of non-limiting example, condensation polymerization reactions of a carboxylic acid group with an amine produce an amide linkage by splitting off water and forming the amide linkage between the carboxyl carbon atom and a nitrogen atom of the amine. These polyamidoamine polymers are often in the form of multi-branched structures, due to the use of amine monomers having multiple nitrogen atoms reactive with carboxylic acid functional groups on dicarboxylic acid or dimerized monomers.

One potential structure of polyamidoamine is shown below in formula (II), solely by way of non-limiting example:

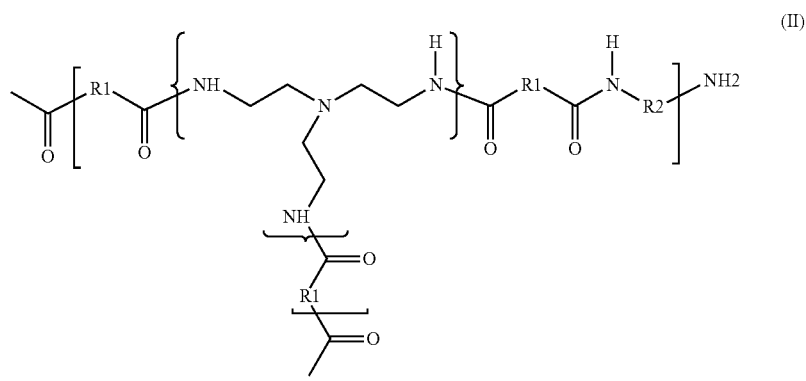

{From Tris(2-aminoethyl)amine}
R1 = 16(CH2)

Where R1 is a C16 alkylene and R2 represents an organic moiety.

Polyamines, that is molecules having at least two amine groups, selected from primary and secondary amines, are particularly useful in such reactions enabling generation of linear and branched polyamidoamines. To increase branching, primary amines having a tertiary amine center, such as tris(2-aminoethyl)amine are often used. Stepwise polymerization can be used to select particular architecture of the polymer using known techniques. Divergent and convergent polymerizations are non-limiting examples of reactions for generating the polymers.

In one embodiment, the polyamidoamine polymers useful in the present invention can be formed by polymerization reactions between one or more polyamines and dicarboxylic acids. An amine functional group reacts with a carboxylic acid functional group to produce a molecule having an amide linkage and remaining amine functionality that react with additional dicarboxylic acid to form further amide linkages and a new amino-terminated branch. The carboxylic acid often is a dicarboxylic acid, dimerized acid or other carboxylic acid having at least two cites reactive with amine, but may be a mono carboxylic acid. The polymeric arms formed may be straight, branched, dendritic, asymmetrical or symmetrical.

The carboxylic acid used to prepare the polyamidoamine polymers can be saturated or unsaturated, linear or branched, aliphatic or cycloaliphatic. It may contain substituents such as chloro, fluoro, bromo, ether, sulfide, keto, hydroxyl, etc., as well as aromatic substituents such as phenyl, tolyl, xylyl, chlorophenyl, hydroxyphenyl, naphthyl, methylnaphthyl, etc.

Examples of acids useful for the preparation of imidazolines adapted for the purposes of the present invention are acetic, propionic, butyric, valeric, caproic, caprylic, myristic, palmitic, oleic, linoleic, linolenic, ricinoleic, stearolic, stearoxylic, phenylstearic, xylylstearic, chlorostearic, hydroxyphenylstearic, naphthenic, arachidic, tricosanoic, and triacontanoic acids. Mixtures of any of the foregoing acids are likewise useful. In most instances, it is preferred to use a carboxylic acid that contains from about 8 to about 20 carbon atoms.

The term unsubstituted alkylene amine is used herein in a generic sense to represent polyamines conforming for the most part to the general formula (III):

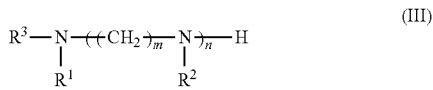

(III)

Where $R^1$ and $R^2$ each independently represent a hydrogen, an organic moiety, preferably a saturated or unsaturated $C_1$ to $C_6$ alkyl group; or $(CH_2)_m-NH_2$; and $R^3$ can be a hydrogen or $(CH_2)_m-NH_2$ m independently represents a number ranging from 2 to 8, preferably 2 to 6; and n independently represents a number ranging from 1 to 8.

Examples of useful unsubstituted alkylene amines include ethylene polyamines such as ethylene diamine, diethylene triamine, triethylenetetramine, tetraethylene pentamine, pentaethylenehexamine, and the like; hexamethyleneheptamine; a symmetrical alkylamines, e.g. N-(3-aminopropyl) ethylene diamine, and substituted ethylene polyamines such as propylene diamine, butylenedlamine, aminoethylpropyl- enediamine, dipropylenetriamine, phenylethylene diamine, otolylethylene diamine, benzylethylene diamine, cyclohexylethylene diamine, Aminoethylpiperazydiethylentriamin, 1-Aminoethylpiperazyltriethylentetramine, etc.

The unsubstituted alkylene amines are preferred, however, and they may be employed as pure compounds or as mixtures, e.g. Polyamine H, a commercially available mixture of ethylene polyamines containing about 30-40 amino radicals, meaning functional groups or functionalities, per molecule. Suitable alkylene polyamines may have an average molecular weight of 100 to 1500. Tetraethylenepentamine is described by one manufacturer as principally a mixture of four TEPA ethyleneamines including linear, branched, two cyclic TEPA products, and higher molecular weight products. These compounds are: TEPA (CAS #000112-57-2, N-(2-aminoethyl)-N'-{2-{(2-aminoethyl) amino}ethyl}-1,2-ethanediamine); AETETA (CAS #031295-46-2, 4-(2-aminoethyl)-N-(2-aminoethyl)-N'-{2-{(2-aminoethyl)amino}ethyl}-1,2-ethanediamine); AEPEEDA (CAS #031295-54-2, 1-(2-aminoethyl)-4-[(2 aminoethyl)aminoethyl]-piperazine); and PEDETA (CAS #031295-49-5, 1-[2-[[2-[(2-aminoethyl)amino]ethyl]amino] ethyl]-piperazine).

Polyethylenepolyamines are mixtures of products described by manufacturers as including TEPA, pentaethylenehexamine (PEHA), hexaethyleneheptamine (HEHA), and higher molecular weight products. One polyethylenepolyamine is described by the manufacturer as a complex mixture of various linear, cyclic, and branched products with a number average molecular weight of 250-300 g/mole.

Suitable polyamidoamine polymers for use according to the present invention may be formed by reacting carboxylic acid functions from monocarboxylic acids, dicarboxylic acids, or dimerized fatty acids, also called dimer acids, with polyamines that comprise at least two amines, selected from primary and secondary amines, while tertiary amines may also be present and provide branching. The monocarboxylic acids useful in the present invention typically come from a fatty acid source such as a vegetable oil or other oils. By way of example only, these oils include: tall oil, corn oil, canola oil, rapeseed oil, cottonseed oil, flaxseed oil, olive oil, palm oil, coconut oil, peanut oil, safflower oil, soybean oil, and sunflower oil. Suitable monocarboxylic acids for use in the present invention include saturated and unsaturated $C_6$ to $C_{24}$ fatty acids. Suitable dicarboxylic acids useful in the present invention include saturated and unsaturated $C_6$ to $C_{18}$ dicarboxylic acids such as, by way of example, adipic acid (hexanedioic acid), pimelic acid (heptanedioic acid), suberic acid (octanedioic acid), azelaic acid (nonanedioic acid), sebacic acid (decanedioic acid), dodecanedioic acid and octadecanedioic acid. Suitable dimer fatty acids useful in the present invention are typically formed from $C_{12}$ to $C_{22}$ saturated or unsaturated fatty acids such as, by way of non-limiting example, palmitic acid, oleic acid, linoleic acid, eicosenoic acid, and stearic acid. In one embodiment, fatty acid reactants comprise mixtures of $C_{18}$ to $C_{20}$ saturated or unsaturated fatty acids.

One class of preferred polyamidoamine polymers used in the present invention is formed from reactions of tall oil fatty acids with polyalkylenepolyamines. In one embodiment, the polyalkylenepolyamines comprise a mixture of polyethylenepolyamines including of TEPA, pentaethylenehexamine (PEHA), hexaethyleneheptamine (HEHA), and higher molecular weight products. In another embodiment, polyalkylenepolyamines comprise a complex mixture of various linear, cyclic, and branched polyamines with a number average molecular weight of 250-300 g/mole.

Another preferred class of polymers is formed by reaction of polyamines having at least two reactive amines, preferably primary amines with $C_{18}$ unsaturated dimerized fatty acids, which once the dimer forms are $C_{36}$ because of the joining of the two $C_{18}$ unsaturated fatty acids.

In one embodiment, the polymer comprises reaction products of a mixture of saturated and unsaturated fatty acids, generally ranging from $C_{16}$ to $C_{20}$, with linear or branched polyethylenepolyamines.

In one embodiment, the nitrogen containing polymer additive is comprised of the polycondensation products of tris-aminoethylamine and octadecanedioic acid, and the polycondensation products of tetraethylenepentamine and octadecanedioic acid.

In one embodiment, water-soluble polyamidoamines having amide and amine portions in the skeleton may be a reaction product of alkyldiamines, polyamines or polyalkylpolyamines with an ethylenically unsaturated carboxylic acid or diacid compound are used.

Polyamines with at least two primary amines used in creating the polyamidoamines that are useful in the present invention include, by way of example only: diamines such as ethylene diamine; polyethylene polyamines such as diethylenetriamine, triethylenetetramine (TETA) or tetraethylenepentamine; and polyamines such as tris(2-aminoethyl) amine. The useful polyamines have two or more primary amine functions. Generally speaking, the primary amines participate in the reactions first, while the secondary amines found in many polyamines can react in these reactions also, however the reaction kinetics for these amines tend to be slower.

Examples of the di- and polyamines include 1,2-diaminobenzene; 1,3-diamino-benzene; 1,4-diaminobenzene; 4,4'-diaminodiphenylmethane; 4,4'-diaminodiphenylsulfone; 2,2'-diaminodiphenylsulfone; 4,4'-diaminodiphenyl oxide; 3,3',5,5'-tetramethyl-4,4'-di-aminodiphenyl; 3,3'-dimethyl-4,4'-diaminodiphenyl; 4,4'-diamino-alpha-methylstilbene; 4,4'-diaminobenzanilide; 4,4'-diamino stilbene; 1,4-bis(4-aminophenyl)-trans-cyclohexane; 1,1-bis(4-aminophenyl) cyclohexane; tris(aminophenyl)methane; 1,4-cyclohexanediamine; 1,6-hexanediamine; piperazine; ethylenediamine; diethylenetriamine; triethylenetetramine; tetraethylenepentamine; 1-(2-aminoethyl)piperazine; bis(aminopropyl)ether; bis(amino-propyl)sulfide; bis(aminomethyl)norbornane; 2,2'-bis(4-aminocyclohexyl)propane; and any combination thereof.

In some embodiments, the pretreatment composition may also comprise imidazolines, typically fatty acid imidazolines, which may be formed by ring-forming reaction of polyamidoamines useful in the invention. Desirably, the imidazolines used in pretreatments according to the invention comprise amidoalkyl imidazolines. The molecular structure of imidazoline, as distinguished from imidazole, consists of three parts: a five-atom ring containing a nitrogen atom (part A), a pendant side chain with an active functional group (part B, R) and a long hydrocarbon chain (part C, R'), as shown in the exemplary formula (IV):

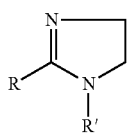
(IV)

The functional groups in R and R' can be variable. In a preferred embodiment, at least one of R and R' comprise one or more amide linkages. In one embodiment, R and R' each independently may be a straight chain or branched $C_6$ to $C_{36}$, preferably $C_8$ to $C_{22}$, most preferably $C_{16}$ to $C_{18}$ alkyl, alkylene, amidoalkyl, aminoalkyl, amidoalkylene, aminoalkylene or aromatic group, preferably alkyl, amidoalkyl, aminoalkyl, amidoalkylene, aminoalkylene or alkylene. In one embodiment, R may be stearyl, napthyl, palmyl, olyl, linolyl or linolenyl. In one embodiment, R' may be stearyl, napthyl, palmyl, olyl, linolyl or linolenyl.

In one embodiment, the fatty acid imidazoline compound includes, but is not limited to, stearic acid imidazoline, naphthenic acid imidazoline, palmitic acid imidazoline, oleic acid imidazoline, linoleic acid imidazoline or linolenic acid imidazoline. In one embodiment, the fatty acid imidazoline may contain a mixture of two or more fatty acid imidazoline compounds.

In one embodiment, the fatty acids may include natural acids derived from tall oils, oleic acid, stearic acid, palmitic acid, linoleic acid, linolenic acid or naphthenic acid or may include synthetically prepared fatty acids. The synthetically prepared fatty acids may include acids with an even number of carbon atoms or an odd number of carbon atoms.

In a typical industrial process it is advantageous that the present process allows for the Group IVB metal containing pretreatment to be applied directly to bare metal substrates just before primers and or paints are applied to the substrates.

The present Group IVB metal pretreatment compositions containing the at least one organic polymer comprising amide functional groups and optionally amine and/or imidazoline functional groups, preferably a polyamidoamine polymer, are typically applied in a wet on wet process, meaning they are applied to a substrate and then subsequent layers are applied without rinsing or drying the substrate after deposition of the Group IVB metal oxide coating. The present inventive Group IVB metal oxide coatings can be dried after application if desired, but this is not necessary. These coatings are typically applied to substrates using a bath of the coating material and dipping the substrate into the bath for a given period of time at a given temperature and then transferring the substrate to the next coating bath. Prior to application of the Group IVB metal oxide coatings, the substrates are cleaned and/or degreased and rinsed. The inventive Group IVB metal containing pretreatment compositions according to the invention can also be applied by spraying, roller application and any other application method providing desired coating weight of the Group IVB metal oxide coatings.

The present Group IVB metal oxide coatings find use as anti-corrosion treatments for all metals and metal alloys, including by way of example only: steel, cold rolled steel, hot dipped galvanized steel, electrogalvanized steel, galvanneal, aluminum and aluminum alloys.

In the present specification, numerous reactive polyamidoamine polymers in accordance with the present invention and some polymers not in accordance with the present invention were tested for their effect on the corrosion resistance and adhesion provided by a standard zirconium oxide containing anti-corrosion coating. Throughout the specification, unless otherwise noted, these polymers will be referred to by their CAS numbers. As known to those of skill in the art, for many polymers the final product of the polymerization reaction is a mixture of various lengths of the polymer so in the present specification some of the polymers in accordance with the present invention are described as the reaction products of a number of polymerization components. For example, CAS 68410-23-1 is designated in the art as the reaction products of $C_{18}$ unsaturated fatty acid and fatty acid dimers, tris(2-aminoethyl)amine, tetraethylenepentamine, and triethylenetetramine.

TABLE OF POLYAMIDOAMINES AND POLYAMINES TESTED

| CAS # or name | Reaction components or structure | Polyamidoamine polymer containing amide linkages in accordance with the present invention? |
|---|---|---|
| Examples | | |
| 68410-23-1 | $C_{18}$ unsaturated fatty acid and fatty acid dimers, tris(2-aminoethyl)amine, tetraethylenepentamine, and triethylenetetramine | Yes |
| 68155-17-9 | Tall oil fatty acids and tetraethylenepentamine | Yes |
| 64754-99-0 | $C_{18}$ unsaturated fatty acids and fatty acid dimers with tall oil fatty acids and polyethylenepolyamines | Yes |
| 68082-29-1 | $C_{18}$ unsaturated fatty acid dimers with tall oil fatty acids and triethylenetetramine | Yes |
| Comparative Examples | | |
| 9003-39-8 | Polyvinylpyrrolidone | No |
| 36833-16-6 | glycoluril resin product with formaldehyde*, | No |
| 30551-89-4 | Poly(allylamine) | No |
| 9012-76-4 | Polyglucosamine, also known as chitosan | No |
| 9002-98-6 | Polyethylenimine | No |

*Also known as tetrahydroimidazo[4,5-d]imidazole-2,5(1H,3H)-dione-formaldehyde (1:1)

As shown in the experimental results and discussed herein polymers with amine functionality but lacking amide linkages, such as for example CAS 30551-89-4, CAS 9012-76-4, and CAS 9002-98-6 did not increase the corrosion protection of zirconium oxide coatings.

Likewise, polyamidoamines having only lactam amide linkages, such as CAS 9003-39-8 and CAS 36833-16-6, did not increase the corrosion protection of the zirconium oxide coatings of the present invention. Both polyvinylpyrrolidone and the above-described glycoluril resin product, have only lactams, meaning amide linkages wherein both the carbon atom and the nitrogen atom that form the amide linkage are members of the same ring structure. Neither of these polymers added to the zirconium containing pretreatment bath resulted in improved corrosion resistance of metal substrates treated with the pretreatment bath to form a zirconium oxide and polymer containing coating.

In the experiments disclosed in the present specification an exemplary zirconium oxide coating was used as the base or control anti-corrosion coating. It is deposited by contact with a typical hexafluorozirconic acid containing treatment. It is but one example of a zirconium containing pretreatment that can benefit from the present invention. In preparing a bath according to the present invention, i.e. a zirconium containing pretreatment bath containing the polyamidoamine and/or amidoalkyl imidazoline polymers preferably the following procedure is followed. A bath container is filled to the desire level with deionized water; then the components of the zirconium containing pretreatment bath minus the polyamidoamine polymer are added and mixed; then the polyamidoamine polymer according to the present invention is added; finally, the pH is adjusted if required to a pH of from 2 to 6, preferably from 3.6 to 5.5.

As known to those of skill in the art, the bath components can be supplied to a user in a plurality of packages, one having the Group IVB metal pretreatment components minus the polyamidoamine polymer, one having the polyamidoamine polymer, and possibly a third have pH adjuster components. The order of addition is important as the polyamidoamines are typically not soluble in deionized water alone; they require the presence of the Group IVB metal pretreatment components in the deionized water first. The components can be supplied in a ready-to-use format or as concentrates that require dilution with deionized water.

The Group IVB metal oxide coating depositing pretreatment composition according to the present invention can also be provided as a replenisher composition to replenish a Group IVB metal oxide depositing pretreatment bath as it is depleted during use. In addition to a complete liquid pretreatment composition as described above, another embodiment of the invention is a liquid dispersion in water of nitrogen-containing polymer according to the invention and, optionally, other components that is useful as a replenisher composition to replace polymer molecules and components consumed by use of a liquid pretreatment composition according to the invention. Such a liquid replenisher composition according to the invention comprises, preferably consists essentially of, or more preferably consists of, water and:

(A) an amount of dissolved source of zirconium that includes the same chemical substances in the same relative proportions as are consumed during use from component a) of the liquid composition to be replenished, said amount being at least 5 times greater than the amount of the same chemical substances in the liquid composition to be replenished;

(B) an amount of dissolved source of copper that includes the same chemical substances in the same relative proportions as are consumed during use from component b) of the liquid composition to be replenished, said amount being at least 5 times greater than the amount of the same chemical substances in the liquid composition to be replenished;

(C) an amount of dispersed or both dispersed and dissolved nitrogen-containing polymer molecules according to the invention that include the same chemical substances in the same relative proportions as are consumed during use from component c) of the liquid composition to be replenished, said amount being at least 5 times greater than the amount of the same chemical substances in the liquid composition to be replenished.

Optionally, the replenisher may contain one or more of the following:

(D) an amount of dissolved source of fluorine that includes the same chemical substances in the same relative proportions as are consumed during use from the fluorine component of the liquid composition to be replenished, said amount being at least 2-5 times greater than the amount of the same chemical substances in the liquid composition to be replenished;

(E) an amount of dissolved source of nitrate that includes the same chemical substances in the same relative proportions as are consumed during use from the nitrate component of the liquid composition to be replenished, said amount being at least 2-5 times greater than the amount of the same chemical substances in the liquid composition to be replenished;

(F) an emulsifying agent component in sufficient quantity to emulsify all dispersed constituent molecules of component (C) so that, in the liquid replenisher composition, no separation or segregation of bulk phases that is perceptible with normal unaided human vision occurs during storage at 25.degree. C. for at least 5 days after preparation of the liquid replenisher composition, in the absence of contact of the liquid replenisher composition with any metal or other substance that reacts with the liquid replenisher composition;

(G) a dissolved accelerator component, selected from the group consisting of acids, oxidizing agents, and complexing agents;

(H) a component of solvent in which constituents of component (C) that are insoluble in water were dissolved during some step in the preparation of the liquid replenisher composition, other than materials that constitute any part of any of the preceding components;

(J) a component of coalescing agent, other than materials that form any part of any of the preceding components;

(K) a plasticizer component, other than materials that constitute any part of any of the preceding components;

(L) a component of non-polymeric cross-linking agents and monomers that do not constitute part of any other component described above but are chemically reactive with component (C) at operating temperature of the pretreatment bath.

The replenisher may be provided in a multi-part package, for example, a two-part package wherein (A) and (B) are in a first part, component (C) is in a second part. Optional ingredients, if present may be divided between the parts according to compatibility or convenience, or added separately.

The testing procedures used to assess corrosion protection or adhesion, other than those specifically described below, are industrial standards and can either be found on-line or purchased through a variety of sources as known to those of skill in the art. In addition, a wide variety of manufacturers sell testing equipment specifically designed to conduct these tests, such as for example Ascott Analytical.

As discussed, the present invention comprises Group IVB metal oxide containing corrosion protection coatings which incorporate at least one nitrogen containing organic polymer, dissolved and/or dispersed in the composition comprising amide functional groups and optionally amine and/or imidazoline functional groups. Desirably, the at least one nitrogen containing polymer comprises one or more polyamidoamine polymers. The corrosion protective effect of these coatings and adhesion of paints and primers to them is enhanced by inclusion in the coating of the polyamidoamine polymers according to the present invention.

Experimental Protocols

Base A, a base zirconium containing pretreatment composition used in the experiments described below, unless otherwise noted, comprised the following components at the indicated levels: Zr 145 to 155 ppm, Cu 10 to 30 ppm, Zn 600 ppm, $NO_3$ 6,000 ppm, free fluoride 27 to 35 ppm, and a pH of 4.0 to 4.3. Base B pretreatment composition had the same components as Base A, but for copper, which was omitted. Base A, on all of the tested substrates and by all of the measures, was able to provide the same level of corrosion protection as a typical zinc phosphate coating composition. Thus, in all the data presented in the present specification, if a test coating performs the same or better than Base A coating alone, the test coating also meets or exceeds performance of a typical zinc phosphate coating. The test polyamidoamine polymers and other polymers shown below were added directly to the Base A coating prior to use.

In all the experiments described below the test panels were standard test panels from ACT Test Panels Technology of Hillsdale, Mich. Test panel substrates from ACT used in the present experiments included the following: Cold Rolled Steel (CRS); Hot Dipped Galvanized Steel (HDG); Electrogalvanized Steel (EG); galvanneal (HIA); Aluminum alloy 6014; and Aluminum alloy 6111.

The panel preparation procedure was as follows. The panels were: sprayed for 1 minute with the alkaline cleaner Bonderite® C-AK T51; immersed in Bonderite® C-AK T51 for 2 minutes; rinsed with city water in a 1 minute spray; rinsed in deionized water 1 minute spray; exposed to zirconium containing pretreatment compositions, as described below, at 90° F. (32° C.) for 120 seconds; rinsed in deionized water 1 minute spray; air dried; and electrocoated with a commercially available primer BASF CathoGuard® 800, per manufacturer's instructions. As discussed herein, the zirconium oxide coatings containing the polyamidoamine polymers according to the present invention are not required to be rinsed off the substrate prior to application of other layers, such as the BASF CathoGuard® 800. The inventive zirconium oxide coatings can be used in any "wet on wet" process know in the art.

After the electrocoating with BASF CathoGuard® 800, all of the test panels were scribed down to the substrate in an X pattern before performing the various tests described below, unless noted otherwise.

A number of different corrosion and paint adhesion testing protocols were used to evaluate zirconium oxide coatings containing various organic polymers, some comparative examples and some examples of coatings according to the invention comprising one or more of amide and imidazoline functional groups, preferably also comprising amine functional groups: General Motors Worldwide test 14872 exposure C (GMW14872) cyclic corrosion laboratory test; General Motors Worldwide test 14829/14704 (GMW14829/14704), which are paint adhesion tests; Volkswagen test PV1210 corrosion resistance test (PV1210); a filiform corrosion test for aluminum and aluminum alloys (FFK); and a 10 day hot salt water soak corrosion test, described below (HSW). The various GMW, PV1210 and FFK tests can be found online as they are standardized tests and will be described briefly below. The 10-day hot salt water soak test is also described more fully below. The GMW14872 test is a corrosion resistance test and was run for 28 cycles±3 cycles for each test, the protocol can be purchased from numerous sources including iHS Standards store online. The GMW14829/GMW 14704 paint adhesion test was run on samples that had been soaked in water for 48 hours, dried, scribed and a tape pull performed to measure adhesion. The Volkswagen PV1210 test comprises for each cycle the following, in order: a 4 hour salt spray test according to DIN EN ISO 9227 NSS; 4 hour storage at 23° C. in normal air ±2° C. and 50%±5% relative humidity according to ISO 554; 16 hours humid heat storage in accordance with DIN EN ISO 6270-2 CH constant climate. After every 5 cycles, there is a 48-hour rest period in accordance with normal air ISO 554-23/50. In the present data the test was run for 30 cycles. The FFK filiform test was run in accordance with DIN EN 3665:1997 for 42 days. The FFK test protocol can be purchased from the American National Standards Institute (ANSI).

The 10-day hot salt water test was performed as follows. On each test sample, an X was scribed down to the substrate. The sample panels were then placed in a 5% by weight solution of NaCl at 55° C. for 240 hours. After 240 hours the panels were washed with water, air dried and then to test adhesion an adhesive tape, cellotape of Nichiban or an equivalent, was applied to the area of the scribed X. The tape was pulled upward with a stretch and the maximal width of film attached to the tape was recorded. To measure corrosion the corrosion movement from the scribe lines outward was measured.

Experimental Testing and Results

In experiment 1, the substrates were either CRS or HDG corrosion tested according to GMW14872. The control pretreatment was Base A, the other treatments included Base A plus the indicated polyamidoamine polymers in accordance with the present invention. The results below are presented in millimeters (mm) of corrosion creep from the scribe marks. The polyamidoamine polymers used in experiment 1 were either CAS 68410-23-1 or CAS 68155-17-9; both are polyamidoamine polymers that have amide linkages in their structure in accordance with the present invention. The CAS 68410-23-1 polyamidoamines are the reaction products of $C_{18}$ unsaturated dimerized fatty acids with tris(2-aminoethyl)amine, tetraethylenepentamine, and triethylenetetramine, the tris(2-aminoethyl)amine leads to branching in the structures. The reaction products tend to have long carbon chains in the structures. The CAS 68155-17-9 polyamidoamine polymers are reaction products of tall oil fatty acids with tetraethylenepentamine and it tends to form branched chain polyamidoamine polymers. The results are presented below in TABLE 1. The results show that both zirconium oxide coatings with the polyamidoamine polymers according to the present invention provided an enhancement of the corrosion protection afforded by the Base A generated zirconium oxide coating alone as evidenced by reduced creep of the corrosion from the scribe marks in the test panels. This was true for both CRS and HDG substrates.

TABLE 1

| Coating | CRS, creep | HDG, creep |
|---|---|---|
| Base A | 8.8 mm | 10.2 mm |
| Base A plus CAS 68410-23-1 (100 ppm) | 5.0 mm | 6.5 mm |
| Base A plus CAS 68155-17-9 (100 ppm) | 5.8 mm | 5.5 mm |

In experiment 2, the substrate was CRS. Following pretreatment with the Base A either alone or Base A plus a polyamidoamine polymer in accordance with the present invention, the panels were coated with CathoGuard® 800 and then corrosion tested according to the 10 day hot salt water soak (HSW) test. The polyamidoamines used were CAS #68410-23-1, described above; CAS #68155-17-9, described above; or CAS #68082-29-1, which is the reaction products of $C_{18}$ unsaturated fatty acid dimers with tall oil fatty acids and triethylenetetramine, so also a polyamidoamine polymer in accordance with the present invention. The polyamidoamine polymers were all used at a level of 100 ppm in the Base A. The results presented below in TABLE 2 are in millimeters (mm) of corrosion creep from the scribe mark. The results show that all three pretreatments according to the present invention dramatically enhanced the corrosion protection of the Base A zirconium oxide coating as evidenced by a reduced corrosion creep from the scribe marks by 5.4 to 10.8 fold.

TABLE 2

| Coating | CRS, creep |
|---|---|
| Base A | 2.7 mm |
| Base A plus CAS 68410-23-1 (100 ppm) | 0.5 mm |
| Base A plus CAS 68155-17-9 (100 ppm) | 0.5 mm |
| Base A plus CAS 68410-29-1 (100 ppm) | 0.25 |

In experiment 3, CRS panels were coated with the pretreatments shown below in TABLE 3, then electro-coated with CathoGuard® 800 and tested in the HSW test for corrosion creep from the scribe lines. The CAS 30551-89-4 polymer is poly(allylamine) and as such the only nitrogen in the structure is in the form of primary amine groups, thus it is not a polyamidoamine. CAS 30551-89-4 polymer added to the Base A coating is a comparative example not in accordance with the present invention.

The results show that CAS 68155-17-9 and CAS 68410-23-1 in accordance with the present invention dramatically reduce the corrosion in the HSW test compared to Base A alone. The poly(allylamine) was not able to enhance the corrosion resistance of the Base A pretreatment and in fact made it worse. These results demonstrate the benefit of amide linkages in the polymer and show that amine groups alone do not confer the enhanced corrosion resistance. In addition, increasing the amount of polyamidoamine polymer in the coating from 100 ppm to 250 ppm provided more enhancement compared to the results of TABLE 2. For CAS 68155-17-9 there was an enhancement of 14.7 fold compared to 5.4 fold above and for CAS 68410-23-1 there was an enhancement of 10.4 fold compared to 5.4 fold above.

TABLE 3

| Composition of pretreatment | CRS, creep |
|---|---|
| Base A | 7.3 mm |
| Base A plus CAS #68155-17-9 at 250 ppm | 0.5 mm |
| Base A plus CAS #68410-23-1 at 250 ppm | 0.7 mm |
| Base A plus CAS #30551-89-4 at 250 ppm | 9.4 mm |

In experiment 4, the effect of removing copper from the Base A pretreatment was tested by using Base B alone or plus the indicated polyamidoamine polymers according to the present invention in TABLE 4. The results in the GMW14872 corrosion test are presented below in TABLE 4. The results show that the presence or absence of the copper did not affect the corrosion resistance provided by the Base A/B alone; however when copper was not present enhancement of the corrosion resistance by either the CAS 68155-17-9 or CAS 68410-23-1 was absent. Thus, copper is required to be in the zirconium oxide depositing pretreatment composition for the effect of the polyamidoamine polymers according to the present invention. As described herein the copper is preferably present in an amount of from 1 to 50 ppm in the zirconium containing pretreatment composition according to the present invention.

TABLE 4

| Composition of pretreatment | Base A, copper present CRS creep | Base B, copper removed CRS creep |
|---|---|---|
| Base without polymer | 6.5 mm | 6.5 |
| Base plus CAS 68155-17-9 at 250 ppm | 6.0 mm | 6.5 |
| Base plus CAS 68410-23-1 at 250 ppm | 5.0 mm | 6.5 |

In experiment 5, a series of polymers were added to Base A to produce zirconium oxide coatings, some in accordance with the present invention and some comparative examples not in accordance with the present invention. The coatings were then applied to CRS panels and tested according to the tests as listed in TABLE 5 below. The results are presented relative to Base A alone and each test sample that was run received its own result symbol. In addition, for CAS 68410-23-1, CAS 68155-17-9, CAS 9003-39-8 and CAS 9002-98-6, samples were run at 250 ppm in Base A and in Base B (copper omitted bath).

Sample performance indicators:

Sample test performance better than Base A or B alone: "↑".

Sample test performance worse than Base A or B alone: "↓".

Sample test performance same as Base A or B alone: "=". For example, CAS 68410-23-1 at 100 ppm in Base A was tested in the HSW test and the performance was better than Base A alone, which is indicated as an upward arrow in TABLE 5. If no sign is found in a box, then a test was not run for that sample.

TABLE 5

| | CRS | | | |
|---|---|---|---|---|
| Base and Polymer added | HSW | GMW14872 | GMW14829/ 14704 | PV1210 |
| Base A plus CAS 68410-23-1, 100 ppm | ↑ | ↑ | = | ↑ |
| Base A plus CAS 68410-23-1, 250 ppm | ↑↑↑ | ↑↑ | === | |
| Base B plus CAS 68410-23-1, 250 ppm | ↑ | = | = | |
| Base A plus CAS 68155-17-9, 100 ppm | ↑ | ↑ | ↓ | ↑ |
| Base A plus CAS 68155-17-9, 250 ppm | ↑↑↑ | ↑= | = | |
| Base B plus CAS 68155-17-9, 250 ppm | = | = | = | |
| Base A plus CAS 64754-99-0, 100 ppm | ↑↑ | ↑ | | ↑ |
| Base A plus CAS 68082-29-1, 100 ppm | ↑↑ | ↑ | | ↑ |
| Base A plus CAS 9003-39-8, 100 ppm | ↓ | | ↓ | ↓ |
| Base A plus CAS 9003-39-8, 250 ppm | ↓↓ | = | ↓↓ | |
| Base B plus CAS 9003-39-8, 250 ppm | ↓ | = | ↓ | |
| Base A plus CAS 30551-89-4, 250 ppm | ↓↓ | ↓ | ↓ | ↓ |
| Base A plus CAS 9012-76-4, 250 ppm | =↓ | ↓ | ↓ | ↓ |
| Base A plus CAS 9002-98-6, 250 ppm | ↓↓↓↓ | ↓↓ | == | = |
| Base B plus CAS 9012-98-6, 250 ppm | ↓ | ↓ | = | |
| Base A plus CAS 36833-16-6, 250 ppm | = | = | = | = |

The results in TABLE 5 show several important things. First, polyamidoamines wherein the amide linkages are non-cyclic show enhancement of the anti-corrosion effect of Base A. See for example the results with CAS numbers 68410-23-1, 68155-17-9, 64754-99-0, and 68082-29-1. The results also show that amide linkages that are cyclic, meaning the nitrogen and carbon are in the same ring structure, do not provide enhancement of the anti-corrosion effect of Base A, and often make it worse. See the results with CAS numbers: 9003-39-8, which is polyvinylpyrrolidone; and 36833-16-6, which is an imidazole. The results also show that polyamines with no amide linkages also do not improve the anti-corrosion effect of Base A. See the results with CAS numbers 30551-89-4, which is poly(allylamine); 9012-76-4, which is polyglucosamine; and 9002-98-6, which is polyethylenimine. The results in Base B also show that for polyamidoamine polymers that are effective in Base A, the presence of copper in the zirconium oxide coating is required since they are not effective in Base B. Preferably, the level of copper in the zirconium oxide depositing pretreatment composition is from about 1 to 30 ppm.

In experiment 6, a series of polymers were added to Base A to produce zirconium containing pretreatments, some in accordance with the present invention and some not in accordance with the present invention. The pretreatments were then applied to EG panels to form zirconium oxide coatings, and tested according to the tests as listed in TABLE 6 below. The results are presented relative to Base A alone and each test sample that was run received its own result symbol. In addition, for CAS 68410-23-1, CAS 68155-17-9, CAS 9003-39-8 and CAS 9002-98-6 samples were run at 250 ppm in Base A and in Base B, copper removed.

TABLE 6

| | EG | | |
|---|---|---|---|
| Polymer added | GMW14872 | GMW14829/ 14704 | PV1210 |
| Base A plus CAS 68410-23-1, 100 ppm | ↑ | = | = |
| Base A plus CAS 68410-23-1, 250 ppm | =↑ | = | |
| Base B plus CAS 68410-23-1, 250 ppm | ↓ | = | |
| Base A plus CAS 68155-17-9, 100 ppm | = | = | = |
| Base A plus CAS 68155-17-9, 250 ppm | ↑ | = | |
| Base B plus CAS 68155-17-9, 250 ppm | = | = | |
| Base A plus CAS 64754-99-0, 100 ppm | = | | = |
| Base A plus CAS 68082-29-1, 100 ppm | = | | = |
| Base A plus CAS 9003-39-8, 100 ppm | = | = | = |
| Base A plus CAS 9003-39-8, 250 ppm | | = | |
| Base B plus CAS 9003-39-8, 250 ppm | = | = | |
| Base A plus CAS 30551-89-4, 250 ppm | ↓ | = | = |
| Base A plus CAS 9012-76-4, 250 ppm | = | = | |
| Base A plus CAS 9002-98-6, 250 ppm | ↓↓↓ | == | = |
| Base B plus CAS 9002-98-6, 250 ppm | = | = | |
| Base A plus CAS 36833-16-6, 250 ppm | = | = | ↓ |

The changes in performance shown on EG substrate were similar to those found on CRS, but not as pronounced. The same polyamidoamines were effective on EG, the cyclic amide linkages and amine only polymers were not effective on enhancement of the anti-corrosion effect of Base A. Finally, copper was required for the effect of the polyamidoamine polymers that are in accordance with the present invention.

In experiment 7, a series of polymers were added to Base A to produce zirconium containing pretreatments, some in accordance with the present invention and some not in accordance with the present invention. The pretreatments were then applied to HDG panels to form zirconium oxide coatings, and tested according to the tests as listed in TABLE 7 below. The results are presented relative to Base A alone and each test sample that was run received its own result symbol. In addition, for CAS 68410-23-1, CAS 68155-17-9, CAS 9003-39-8 and CAS 9002-98-6 samples were run at 250 ppm in Base A and in Base B, copper removed.

TABLE 7

HDG

| Polymer added | GMW14872 | GMW14829/ 14704 | PV1210 |
|---|---|---|---|
| Base A plus CAS 68410-23-1, 100 ppm | ↑ | = | = |
| Base A plus CAS 68410-23-1, 250 ppm | ↑ | = | |
| Base B plus CAS 68410-23-1, 250 ppm | = | = | |
| Base A plus CAS 68155-17-9, 100 ppm | ↑= | ↓ | ↓ |
| Base A plus CAS 68155-17-9, 250 ppm | ↑= | ↓ | |
| Base B plus CAS 68155-17-9, 250 ppm | = | ↓ | |
| Base A plus CAS 64754-99-0, 100 ppm | = | | = |
| Base A plus CAS 68082-29-1, 100 ppm | = | | ↓ |
| Base A plus CAS 9003-39-8, 100 ppm | ↓ | = | ↓ |
| Base A plus CAS 9003-39-8, 250 ppm | ↓ | = | |
| Base B plus CAS 9003-39-8, 250 ppm | ↓ | = | |
| Base A plus CAS 30551-89-4, 250 ppm | | = | = |
| Base A plus CAS 9012-76-4, 250 ppm | | = | = |
| Base A plus CAS 9002-98-6, 250 ppm | ↓↓ | ↓↓ | = |
| Base B plus CAS 9002-98-6, 250 ppm | = | ↓ | |
| Base A plus CAS 36833-16-6, 250 ppm | | = | ↓ |

The results on HDG substrate were similar to those found on EG. The same polyamidoamines were effective on HDG, the cyclic amide linkages and amine only polymers were not effective on enhancement of the anti-corrosion effect of Base A. Finally, copper was required for the effect of the polyamidoamine polymers that are in accordance with the present invention.

In experiment 8, a series of polymers were added to Base A to produce zirconium containing pretreatments, some in accordance with the present invention and some not in accordance with the present invention. The pretreatments were then applied to aluminum alloy panels to form zirconium oxide coatings, and tested according to the tests as listed in TABLE 8 below. The results are presented relative to Base A alone and each test sample that was run received its own result symbol. In addition, for CAS 68410-23-1, CAS 68155-17-9, CAS 9003-39-8 and CAS 9002-98-6 samples were run at 250 ppm in Base A and in Base B, copper removed.

TABLE 8

Al

| Polymer added | GMW14872 | GMW14829/ 14704 | FFK |
|---|---|---|---|
| Base A plus CAS 68410-23-1, 100 ppm | = | = | = |
| Base A plus CAS 68410-23-1, 250 ppm | = | = | |
| Base B plus CAS 68410-23-1, 250 ppm | = | = | |

TABLE 8-continued

Al

| Polymer added | GMW14872 | GMW14829/ 14704 | FFK |
|---|---|---|---|
| Base A plus CAS 68155-17-9, 100 ppm | = | = | ↑ |
| Base A plus CAS 68155-17-9, 250 ppm | = | = | |
| Base B plus CAS 68155-17-9, 250 ppm | = | = | |
| Base A plus CAS 64754-99-0, 100 ppm | | | ↑ |
| Base A plus CAS 68082-29-1, 100 ppm | | | ↑ |
| Base A plus CAS 9003-39-8, 100 ppm | = | = | |
| Base A plus CAS 9003-39-8, 250 ppm | = | = | |
| Base B plus CAS 9003-39-8, 250 ppm | = | = | |
| Base A plus CAS 30551-89-4, 250 ppm | = | = | ↓ |
| Base A plus CAS 9012-76-4, 250 ppm | = | = | |
| Base A plus CAS 9002-98-6, 250 ppm | == | == | ↓ |
| Base B plus CAS 9002-98-6, 250 ppm | = | = | |
| Base A plus CAS 36833-16-6, 250 ppm | = | = | |

The results on aluminum substrate were similar to those found on EG. The same polyamidoamines were effective on aluminum, with the FFK test being the most responsive, the cyclic amide linkages and amine only polymers were not effective on enhancement of the anti-corrosion effect of Base A. Finally, copper was required for the effect of the polyamidoamine polymers that are in accordance with the present invention In experiment 9, either CAS 68410-23-1 or CAS 68155-17-9 were added to Base A at a level of 15 ppm, 50 ppm, 100 ppm, 150 ppm, 250 ppm or 500 ppm and then applied to CRS panels and tested according to the tests as listed in TABLE 9 below. The results are presented relative to Base A alone and each test sample that was run received its own result symbol.

TABLE 9

CRS

| Polymer and level | HSW | GMW14872 | GMW14829/14704 | PV1210 |
|---|---|---|---|---|
| CAS 68410-23-1 | | | | |
| 15 ppm | ↑ | ↑ | = | ↑ |
| 50 ppm | ↑ | ↑ | = | ↑ |
| 100 ppm | ↑ | = | = | = |
| 150 ppm | ↑ | ↑ | = | ↑ |
| 250 ppm | ↓ | ↑ | = | ↓ |
| 500 ppm | ↓ | ↓ | = | ↓ |
| CAS 68155-17-9 | | | | |
| 15 ppm | = | ↑ | = | ↑ |
| 50 ppm | ↑ | ↑ | = | ↑ |
| 100 ppm | ↑ | ↑ | = | ↑ |
| 150 ppm | ↑ | = | = | ↑ |
| 250 ppm | ↑ | ↑ | ↓ | ↑ |
| 500 ppm | ↑ | ↑ | = | ↑ |

The results show a relationship between the corrosion protective enhancement effect and the level of polyamidoamine in the Base A formulation. The effective enhancement can be seen with as little as 15 ppm of the polyamidoamine polymer.

In experiment 10, either CAS 68410-23-1 or CAS 68155-17-9 were added to Base A at a levels of 15 ppm, 50 ppm, 100 ppm, 150 ppm, 250 ppm or 500 ppm and then applied to EG panels and tested according to the tests as listed in TABLE 10 below. The results are presented relative to Base A alone and each test sample that was run received its own result symbol.

TABLE 10

| Polymer and level | GMW14872 | GMW14829/14704 | PV1210 |
|---|---|---|---|
| CAS 68410-23-1, 15 ppm | = | = | ↑ |
| 50 ppm | = | = | ↑ |
| 100 ppm | = | = | ↑ |
| 150 ppm | = | = | ↑ |
| 250 ppm | = | = | ↑ |
| 500 ppm | = | = | ↑ |
| CAS 68155-17-9, 15 ppm | = | = | ↑ |
| 50 ppm | = | = | ↑ |
| 100 ppm | = | = | = |
| 150 ppm | = | = | ↓ |
| 250 ppm | = | ↓ | ↑ |
| 500 ppm | = | ↓ | ↑ |

The results are less pronounced than for CRS, however they show a dependence of the corrosion protective enhancement effect on the level of polyamidoamine in the Base A formulation as expected. The effective enhancement can be seen with as little as 15 ppm of the polyamidoamine polymer.

In experiment 11, either CAS 68410-23-1 or CAS 68155-17-9 were added to Base A at a level of 15 ppm, 50 ppm, 100 ppm, 150 ppm, 250 ppm or 500 ppm and then applied to HDG panels and tested according to the tests as listed in TABLE 11 below. The results are presented relative to Base A alone and each test sample that was run received its own result symbol.

TABLE 11

| Polymer and level | GMW14872 | GMW14829/14704 | PV1210 |
|---|---|---|---|
| CAS 68410-23-1, 15 ppm | = | = | = |
| 50 ppm | = | = | ↑ |
| 100 ppm | = | = | ↑ |
| 150 ppm | = | = | = |
| 250 ppm | = | = | = |
| 500 ppm | = | = | = |
| CAS 68155-17-9, 15 ppm | = | = | ↓ |
| 50 ppm | = | = | ↑ |
| 100 ppm | = | ↓ | = |
| 150 ppm | = | = | = |
| 250 ppm | = | ↓ | ↑ |
| 500 ppm | = | ↓ | ↑ |

The results are similar to those found on EG and they show a dependence of the corrosion protective enhancement effect on the level of polyamidoamine in the Base A formulation as expected.

In experiment 12, either CAS 68410-23-1 or CAS 68155-17-9 were added to Base A at a levels of 15 ppm, 50 ppm, 100 ppm, 150 ppm, 250 ppm or 500 ppm and then applied to Al 6111 panels and tested according to the tests as listed in TABLE 12 below. The results are presented relative to Base A alone and each test sample that was run received its own result symbol.

TABLE 12

| Polymer and level | GMW14872 | GMW14829/14704 |
|---|---|---|
| CAS 68410-23-1, 15 ppm | = | = |
| 50 ppm | = | = |
| 100 ppm | = | = |
| 150 ppm | = | = |
| 250 ppm | = | = |
| 500 ppm | = | = |
| CAS 68155-17-9, 15 ppm | = | = |
| 50 ppm | = | = |
| 100 ppm | = | = |
| 150 ppm | = | = |
| 250 ppm | = | = |
| 500 ppm | = | = |

As shown before, addition of the polyamidoamine polymers to Base A did not have an enhancement effect in these corrosion tests, unlike the FFK test for corrosion.

In experiment 13, CAS 68410-23-1 and CAS 68155-17-9 were combined at amounts of 50 ppm each or 100 ppm each, then added to Base A before being applied to test panels of CRS, EG, HDG or Al 6111, and tested according to the tests as listed in TABLE 13 below. The results are presented relative to Base A alone and each test sample that was run received its own result symbol.

TABLE 13

| Polymer combination and substrate | HSW | GMW14872 | GMW14829/14704 | PV1210 |
|---|---|---|---|---|
| CAS 68410-23-1 50 ppm & CAS 68155-17-9 50 ppm on CRS | ↑ | ↑ | = | = |
| CAS 68410-23-1 50 ppm & CAS 68155-17-9 50 ppm on EG | | = | = | ↑ |
| CAS 68410-23-1 50 ppm & CAS 68155-17-9 50 ppm on HDG | | = | = | ↑ |
| CAS 68410-23-1 50 ppm & CAS 68155-17-9 50 ppm on Al | | = | = | |
| CAS 68410-23-1 100 ppm & CAS 68155-17-9 100 ppm on CRS | ↑ | ↑ | = | ↑ |
| CAS 68410-23-1 100 ppm & CAS 68155-17-9 100 ppm on EG | | = | = | ↑ |
| CAS 68410-23-1 100 ppm & CAS 68155-17-9 100 ppm on HDG | | = | = | ↑ |
| CAS 68410-23-1 100 ppm & CAS 68155-17-9 100 ppm on Al | | = | = | |

In experiment 14, CAS 68410-23-1 was added to a Base A coating solution at a level of 250 ppm and then deposited into panels of CRS, HDG, EG, galvanneal (HIA), or aluminum alloy 6111, as described herein. Following deposition, the test and control coatings were analyzed by Glow-Discharge Optical Emission Spectroscopy (GDOES), a technique that allows one to map the amount of an element throughout the thickness of a coating and one can map the depth of various elements in the coating and determine coating thickness. Using this technique it was found that for all the test panels the presence of CAS 68410-23-1 reduced the amount of copper deposited in the coating. The results also showed that CAS 68410-23-1 was incorporated into the coating itself. Coatings of Base A alone had a nitrogen level of less than 0.2% by weight on all substrates; for pretreatment compositions incorporating the CAS 68410-23-1 polymer, the coatings on all substrates had a nitrogen level of from 2 to 10% by weight based on total coating weight. This a clear indication that the polymer was incorporated into the coating. The mapping of the nitrogen on all of the substrates tested showed that the polymer was distributed throughout the coating layer. In some there was a gradient with more polymer found in the outer portions of the coating and in others the polymer has evenly distributed throughout the coating.

In experiment 15, CAS 68155-17-9 was added to Base A at a level of 250 ppm and then deposited into panels of CRS, HDG, EG, galvanneal (HIA), or aluminum alloy 6111 as described herein. Following deposition, the test and control coatings were analyzed by GDOES as above. Testing results of zirconium oxide coatings deposited from pretreatments containing CAS 68155-17-9 were similar to test results from experiment 14's for CAS 68410-23-1. Namely, for all the test panels the presence of CAS 68155-17-9 reduced the amount of copper deposited in the coating. The results also showed that CAS 68155-17-9 was incorporated into the coating. Coatings of Base A alone had a nitrogen level of less than 0.2% by weight on all substrates; for pretreatment compositions incorporating the CAS 68155-17-9, the coatings on all substrates had a nitrogen level of from 2 to 10% by weight based on total coating weight. This a clear indication that the polymer was incorporated into the coating. The mapping of the nitrogen on all of the substrates tested showed that the polymer was distributed throughout the coating layer. In some samples, there was a gradient with more polymer found in the outer portions of the coating and in others the polymer has evenly distributed throughout the coating.

When either CAS 68410-23-1 or CAS 68155-17-9 were added to Base A they form copper complexes as evidenced by a color change in the solution to a purple color.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An aqueous anti-corrosion metal pretreatment composition, for depositing Group IVB metal oxide containing conversion coatings, comprising components:
    a) from 10 to 2000 ppm of dissolved Group IVB metal;
    b) from 1 to 50 ppm of dissolved copper;
    c) from 1 to 5000 ppm of one or more nitrogen containing organic polymers, dissolved and/or dispersed in the composition and comprising a plurality of organic amide functional groups, a plurality of amine functional groups and, optionally, one or more imidazoline functional groups formed by dehydration of at least one of the plurality of organic amide functional groups, wherein the one or more nitrogen containing organic polymers are selected from the group consisting of linear and/or branched polyamidoamine polymers according to the general formula (I):

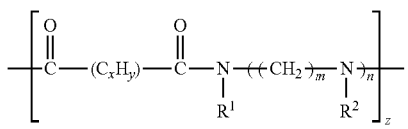

where, independently for each of said one or more polyamidoamine polymers:
$R^1$ represents a hydrogen or an organic moiety;
$R^2$ represents a hydrogen or a saturated or unsaturated alkyl group;
m represents a number ranging from 1 to 8; n represents a number ranging from 1 to 8; x represents a number ranging from 1 to 40; y represents a number ranging from 2 to 80; and z represents a number ranging from 2 to 500; and
d) water;
said aqueous anti-corrosion metal pretreatment composition having a pH of from 2 to 6 and does not include zinc phosphate.

2. The anti-corrosion metal pretreatment composition of claim 1, wherein the polymer c) has a viscosity at 25° C. of 1 to 400 poise.

3. The anti-corrosion metal pretreatment composition of claim 1, wherein the one or more nitrogen containing polymers of component c) comprises at least one of the plurality of amine functional groups having $R^2$ that represents a saturated or unsaturated alkyl group, in addition to the plurality of amide functional groups.

4. The anti-corrosion metal pretreatment composition of claim 3, wherein the polymer c) has an amine value in a range of 100 to 1000 mg KOH/gram of polymer.

5. The anti-corrosion metal pretreatment composition of claim 1, wherein c) remains stably dissolved and/or dispersed in the composition against spontaneous separation or segregation of bulk phases that is perceptible with normal unaided human vision during storage at 25° C. for at least 10 days after preparation of the pretreatment composition.

6. The anti-corrosion metal pretreatment composition of claim 1, wherein the Group IVB metal is zirconium.

7. The anti-corrosion metal pretreatment composition of claim 6, wherein the one or more nitrogen containing polymers has a weight average molecular weight ranging from 200 to 10,000 Daltons.

8. The anti-corrosion metal pretreatment composition of claim 1, wherein less than 25 molar percent of nitrogen atoms contained in the polymer c) are part of a lactam ring.

9. The anti-corrosion metal pretreatment composition of claim 3, wherein at least some of the organic amide functional groups have dehydrated to imidazoline functional groups.

10. The anti-corrosion metal pretreatment composition of claim 1, wherein the polymer c) comprises tertiary nitrogen atoms having three alkylene substituents each terminated with a nitrogen atom.

11. The anti-corrosion metal pretreatment composition of claim 1, wherein the polymer c) has multiple branches.

12. The anti-corrosion metal pretreatment composition of claim 1, wherein said coating composition further comprises from 5 to 200 ppm of free fluoride and has a pH of 3.6 to 5.5.

13. The anti-corrosion metal pretreatment composition of claim 1, wherein said coating composition further comprises at least 3000 ppm of nitrate ions.

14. The anti-corrosion metal pretreatment composition of claim 1, wherein the polymer c) comprises at least one polyamidoamine polymer which is a reaction product resulting from a polymerization reaction of alkyldiamines, polyamines and/or polyalkylpolyamines with a carboxylic acid or carboxylic acid derivative having a reactive carboxylate group and at least one additional amine reactive functional group.

15. The anti-corrosion metal pretreatment composition of claim 14, wherein said polyamines are selected from the group consisting of polyethylene polyamines, polypropylene polyamines, polybutylene polyamines, polypentylene polyamines, polyhexylene polyamines, and mixtures thereof.

16. The anti-corrosion metal pretreatment composition of claim 14, wherein the carboxylic acid or carboxylic acid derivative is selected from the group consisting of fatty acid dimers, tall oil fatty acids, and mixtures thereof.

17. The anti-corrosion metal pretreatment composition of claim 1, wherein said polymer c) comprises at least one polyamidoamine polymer which is a reaction product resulting from a polymerization reaction of:
   1) at least one carboxylic acid selected from the group consisting of a $C_6$ to $C_{24}$ monocarboxylic fatty acid, a $C_6$ to $C_{20}$ dicarboxylic acid, a $C_{12}$ to $C_{40}$ fatty acid dimer, and mixtures thereof; and
   2) at least one polyamine having at least two amine groups.

18. The anti-corrosion metal pretreatment composition of claim 17, wherein said at least one polyamine is selected from the group consisting of diamines, tris(2-aminoethyl)amine, polyethylene polyamines, and mixtures thereof.

19. An anti-corrosion metal pretreatment composition, for depositing Group IVB metal oxide containing conversion coating, comprising components:
   a) from 20 to 1000 ppm of dissolved Group IVB metal selected from Zr, Ti, Hf and combinations thereof;
   b) from 1 to 50 ppm of dissolved copper;
   c) from 1 to 5000 ppm of at least one nitrogen containing organic polymer, dissolved and/or dispersed in the composition and comprising a plurality of organic amide functional groups, a plurality of amine functional groups and, optionally, one or more imidazoline functional groups derived from dehydration of one or more of the plurality of organic amide functional groups, wherein component c) comprises one or more polyamidoamine polymers comprising one or more tertiary amine centers having three substituents each terminated with a nitrogen atom, said nitrogen atom being further polymerized with other monomers; and
   d) water;
wherein said anti-corrosion metal pretreatment composition has a pH of from 2 to 6 and does not include zinc phosphate.

* * * * *